United States Patent [19]

Sollami

[11] 3,999,770
[45] Dec. 28, 1976

[54] ROTARY CYLINDER AND AUTOMATIC COLLECT HOLDER

[76] Inventor: Phillip A. Sollami, 438 Sherman St., Downers Grove, Ill. 60515

[22] Filed: July 28, 1975

[21] Appl. No.: 599,813

[52] U.S. Cl. .................................. 279/4; 279/38
[51] Int. Cl.² .................................... B23B 31/30
[58] Field of Search ........... 279/4, 38, 39, 53, 58; 51/219 R, 219 PC; 92/125

[56] References Cited

UNITED STATES PATENTS

| | | | |
|---|---|---|---|
| 1,786,689 | 12/1930 | White | 279/4 X |
| 1,939,788 | 12/1933 | Olson | 279/4 X |
| 2,548,096 | 4/1951 | Bryant et al. | 279/38 X |
| 2,886,007 | 5/1959 | Manchester | 279/4 X |
| 3,131,610 | 5/1964 | Paulos | 92/125 |
| 3,688,645 | 9/1972 | Reaves | 92/125 |

*Primary Examiner*—Leonidas Vlachos
*Assistant Examiner*—W. R. Briggs
*Attorney, Agent, or Firm*—Edmond T. Patnaude

[57] ABSTRACT

A rotary cylinder has a tubular drive shaft to one end of which is connected a collet holder and to the other end of which is connected an adjustable stop mechanism. A drive rod extends through the shaft and is connected at one end to a collet and at the other end to a fluid operated reciprocal drive mechanism.

5 Claims, 4 Drawing Figures

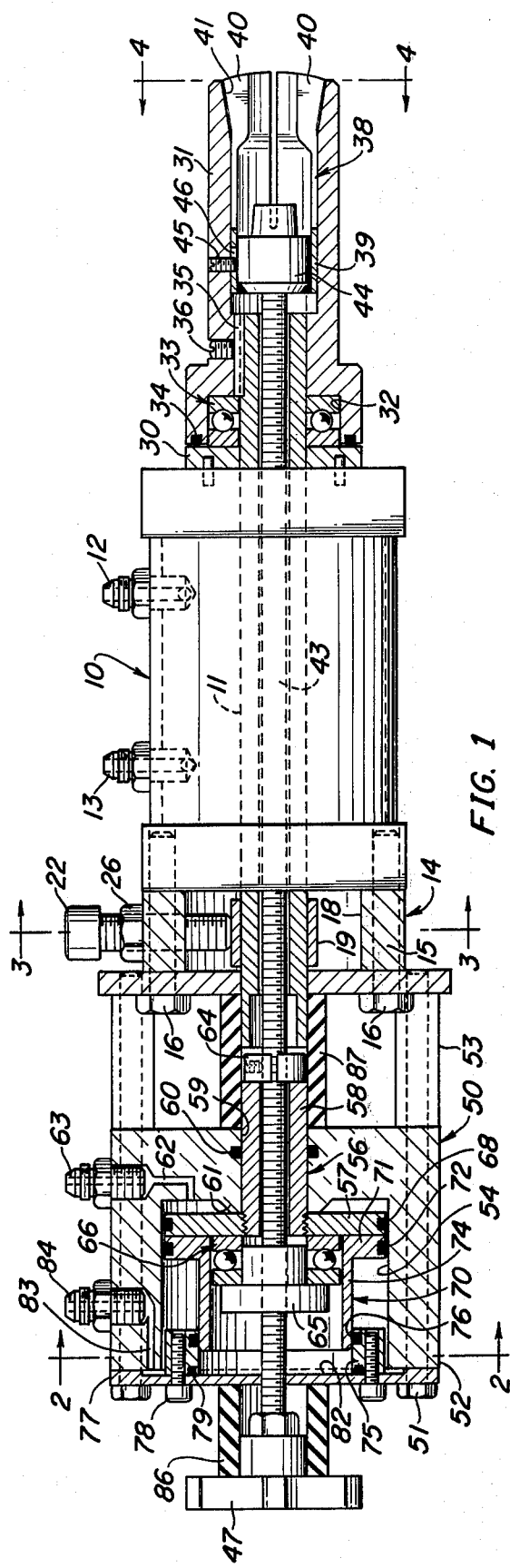
FIG. 1
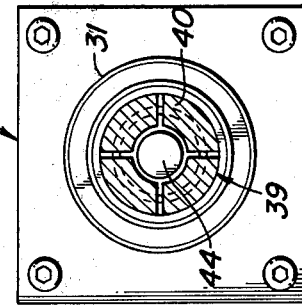
FIG. 4
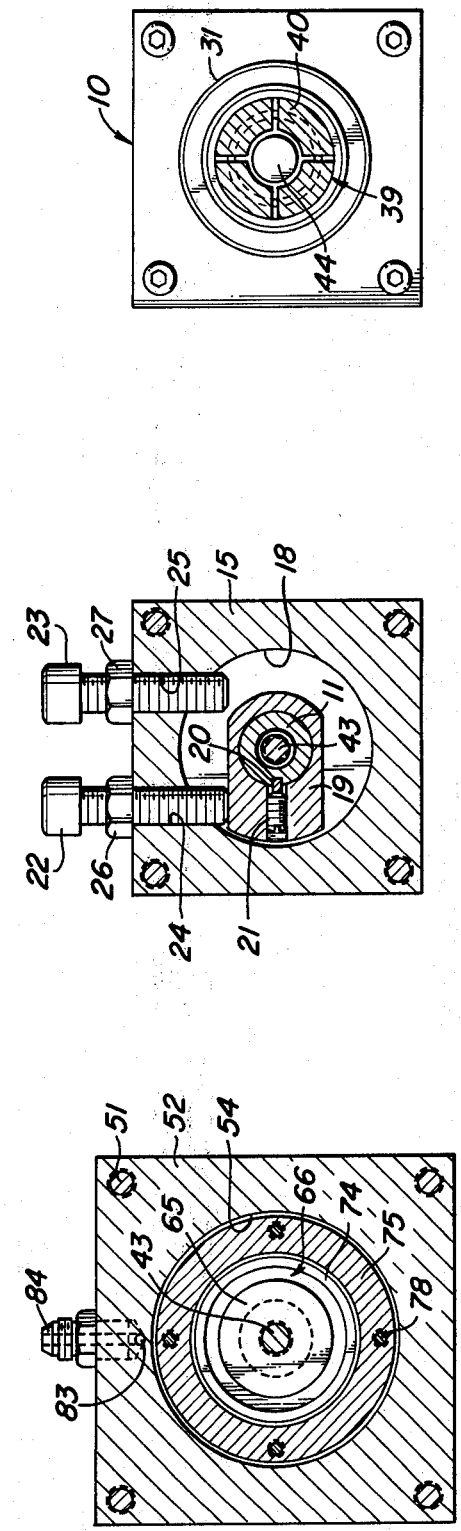
FIG. 3
FIG. 2

ROTARY CYLINDER AND AUTOMATIC COLLECT HOLDER

The present invention relates in general to automatic collets for holding work pieces during metal removal operations, and it relates in particular to a new and improved mechanism for automatically opening and closing a collet rotationally driven by a rotary cylinder.

BACKGROUND OF THE INVENTION

For certain applications such, for example, as sharpening drill bits it is necessary to hold the bit at a first angle during the initial grinding operation and then to hold the bit at a second angle during the subsequent grinding operation. A fluid operated rotary cylinder such as described in U.S. Pat. No. 3,131,610 may be connected to a collet for automatically rotating the drill bits between the first and second angular positions. My copending application Ser. No. 483,531 filed June 27, 1974, now U.S. Pat. No. 3,905,157 discloses a grinding machine incorporating such a rotary cylinder. In that machine, it is necessary for the operator to manually release the bit from the tool holder prior to removal and to lock the bit in the tool holder after insertion therein.

In order to increase the rate at which drill bits can be sharpened in the machine described in my said application it would be desirable to employ an automatic collet which automatically releases the bits at the end of each complete sharpening operation and which locks the bits in the collet at the beginning of each such operation. Not only does the automatic collet increase the effective speed of the machine but it adds an additional safety factor by assuring that each bit is firmly locked in the collet when engaged with the grinding wheel.

SUMMARY OF THE INVENTION

Briefly, the present invention provides a tool bit holder which automatically rotates the bit between two adjustable angular positions and which automatically opens and closes the bit holding collet to facilitate the loading and unloading of the tool bits prior to and after sharpening.

BRIEF DESCRIPTION OF THE DRAWINGS

Further objects and advantages and a better understanding of the present invention can be had by reference to the following detailed description, wherein:

FIG. 1 is a longitudinally sectioned view of the rotary cylinder and automatic collet of the present invention;

FIG. 2 is a sectional view taken along the line 2—2 of FIG. 1;

FIG. 3 is a sectional view taken along the line 3—3 of FIG. 1; and

FIG. 4 is a sectional view taken along the line 4—4 of FIG. 1.

DETAILED DESCRIPTION OF THE INVENTION

Referring to FIG. 1, a rotary drive means 10 includes a drive shaft 11 which is rotatably oscillated between two angular positions in response to control signals supplied thereto. Preferably the drive means 10 is a fluid operated rotary cylinder such as the one described in U.S. Pat. No. 3,131,610. It incorporates a pair of fluid ports 12 and 13 which communicate with opposite sides of a rotary piston (not shown). A positive pressure differential between the port 12 and the port 13 causes the rotary piston to rotate in one angular direction while a positive pressure differential between the port 13 and the port 12 causes the rotary piston to rotate in the opposite angular direction.

In order to adjust each of the two angular positions to which the drive shaft 11 is rotated, an adjustor assembly 14 is mounted to one end of the housing of the rotary drive means 10. The adjustor 14 includes a housing block 15 attached to the rotary drive means 10 by a plurality of hex head machine screws 16. The shaft 11 extends through a cylindrical bore 18 in the block 15 and an arm 19 is keyed and locked thereto by means of a key 20 and a set screw 21 as best shown in FIG. 3. A pair of adjusting screws 22 and 23 are threadedly received in parallel holes 24 and 25. The inner ends of the screws 22 and 23 thus provide stops against which the arm 19 respectively abuts during each grinding step. The screws 22 and 23 are locked in the adjusted positions by means of nuts 26 and 27 respectively.

Mounted to the forward end (right as shown in FIG. 1) of the rotary drive means housing is a thrust washer 30. A collet holder 31 has a counterbore 32 in which is mounted a thrust bearing 33. The length of the bearing 33 is slightly greater than the depth of the counterbore 32 and a resilient O-ring 34 is fitted in an annular groove in the end of the collet holder to seal the bearing 33 from the ambient. The collet holder 31 is keyed to the shaft 11 by means of a key 35 and is locked to the shaft 11 by a set screw 36. A collet 38 positioned in the collet holder 31 has a generally cylindrical base portion 39 and a plurality of outwardly biased fingers 40 which are compressed together by the conical surface 41 of the collet holder as the collet 38 is retracted into the collet holder.

In order to move the collet 38 between the retracted bit locking position shown in FIG. 1 and an extended open position, a drive rod 43 extends through a hole in the base of the collet and is secured thereto by a nut 44 welded to the base of the collet. A set screw 45 extends through a threaded hole in the collet holder 31 into a longitudinal slot 46 in the collet to prevent relative rotation between the collet and collet holder.

The drive shaft 11 is tubular and the drive rod 43 extends freely therethrough, a hand knob 47 being fixed to the rear end thereof for manual operation of the collet if necessary.

In order to controllably reciprocate the drive rod along its longitudinal axis for the purpose of opening and closing the collet, a fluid operated reciprocating device 50 is mounted to the rear plate of the adjustor 14 by means of a plurality of hex head screws 51 threadedly received in the rear plate. The device 50 comprises a housing 52 spaced from the adjustor by a plurality of rigid spacer tubes 53. The housing 52 has a cylindrical bore 54 therein. A first piston assembly 56 includes a disc 57 threaded onto a sleeve 58 slidably disposed in an axial hole 59 in the housing 52. A resilient O-ring 60 is mounted in an annular groove in the wall of the hole 59 to seal the sleeve 58 to the housing 52. A bore 61 surrounds the hole 59 to provide a stop for preventing the piston from bottoming against the end wall of the cylinder chamber. A passageway 62 connects the bottom of the cylinder chamber to a fluid port 63 in a suitable fitting. A split nut 64 is threaded in the rod 43 between the adjacent ends of the drive shaft 11 and the piston sleeve 58 so that when the piston 56 moves forward the drive rod 43 is pushed forward. A nut 65 is threaded onto the rod 43 and a thrust bearing 66 is located between the head of the nut 65 and the disc 57 to prevent relative rotation between the drive rod and the piston when the collet is in the retracted locked position. An O-ring 68 is mounted in a peripheral annular groove in the piston disc 57 to seal the piston to the cylinder wall so that a pressure differential can be established across the piston.

A second piston 70 has an annular flange-like portion 71 having an annular peripheral groove receiving an O-ring 72 for sealing the piston 70 to the cylinder wall. A rearwardly extending cylindrical sleeve 74 slidably extends into the bore of a sealing ring 75, and the sleeve 74 is sealed to the ring 75 by an O-ring 76. The piston 70 is not mechanically connected to the piston 56. The sealing ring 75 is mounted by a plurality of screws 78 to the inner side of a cover plate 77 which is in turn mounted to the housing 52 by the screws 51. A resilient O-ring 79 is compressed between the sealing ring 75 and the cover plate 77.

The central portion of the inner face of the cover plate 77 has a shallow circular recess 82, and a fluid passageway 83 in the housing 52 opens into the recess 82. The passageway 83 connects to a fluid port 84 in a suitable fitting provided at the top of the housing 52. A suitable dust sleeve 86 is positioned between the knob 47 and the cover plate 77 and a similar dust sleeve 87 is positioned between the housing 52 and the adjustor.

OPERATION

In operation, a source of pressurized air at a pressure of for example 80 psi may be used to drive the rotary drive mechanism 10 and the reciprocating drive means 50. A positive pressure differential between the port 84 and the port 63 will act on the rear annular wall of the flange portion 71 of the piston 70 to push the piston into the right hand position as shown in FIG. 1. As the piston 70 moves to the right it pushes the piston 56 which in turn pushes the split nut 64 and thus the drive rod 43 to which it is connected. The collet 39 is thus open and a drill bit may be inserted therein or removed therefrom. After a bit has been inserted in the collet, a positive pressure differential is established by suitable means (not shown) between the port 63 and the port 84. The piston 56 is thus pushed rearwardly in the cylinder bore 54 to exert a rearward force through the thrust bearing 66 on the nut 65. Since the nut 65 is threaded onto the drive rod 43 the rod is pulled rearwardly to retract the collet 39 into the collet holder 31 to lock the drill bit in place therein. This positive pressure differential is maintained between the ports 63 and 84 throughout the grinding operation which is completed in two operations.

In the first grinding operation the entire unit shown in FIG. 1 is moved toward a rotating grinding wheel to grind one edge of the drill bit. The unit is then moved away from the wheel and the pressure differential between the ports 12 and 13 is reserved to rotate the bit through 180°. This is accomplished by rotation of the collet holder 31 which is keyed to the shaft 11. The collet 39 is simultaneously rotated by means of the screw 45 which extends into the alignment slot 46. The thrust bearings 33 and 66 reduce the torque load which would otherwise be exerted on the rotary drive unit 10 and also prevent opening of the collet when the unit 10 indexes through 180°. The entire unit is again moved forward to grind the second edge of the drill bit. The unit is then withdrawn and the reciprocating drive means 50 operated to push the drive rod to the right to open the collet and release the bit. The operator then removes the sharpened bit, replaces it with another bit and initiates another grinding operation as described above.

While the present invention has been described in connection with a single embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. Apparatus of the type described, comprising in combination,
   fluid operated rotary drive means including a housing having a tubular drive shaft journaled therein,
   said drive means selectively rotating said drive shaft in one direction or the other,
   adjuster means mounted to one end of said housing,
   said drive shaft extending into said adjuster means,
   an arm mounted to said drive shaft and located within said adjuster means,
   said adjuster means including a pair of adjustable stops which coact with said arm for setting two respective angular positions to which said drive shaft is driven by said drive means,
   a collet holder positioned at the other end of said housing,
   said drive shaft extending into said collet holder and secured thereto,
   thrust bearing means positioned between said collet holder and said housing
   a collet axially movable in said collet holder,
   a reciprocable drive rod extending through said drive shaft and secured at one end to said collet,
   fluid operated means mounted to the end of said adjuster means opposite said drive means and connected to said drive rod for axially moving said collet relative to aid collet holder to open and close said collet,
   said drive rod extending through said fluid operated means, and
   means mounted to the end of said rod opposite the end to which said collet is connected to permit manual operation of said collet.

2. The combination set forth in claim 1 comprising second thrust bearing means interposed between said fluid operated means and said drive rod.

3. The combination set forth in claim 1 wherein said adjustor comprises,
   a second housing fixed to said drive means housing and having a bore therethrough,
   said drive shaft extending into said bore,
   an arm fixed to said shaft and positioned within said bore, and
   said adjustable stop means comprising first and second stop screws extending through threaded holes in said second housing for selective engagement with said arm.

4. The combination set forth in claim 3 wherein said first and second stop screws are positioned in mutually parallel relationship.

5. The combination set forth in claim 1 wherein said fluid operated means comprises
   a cylinder having first and second fluid passageways connected to opposite ends thereof,
   a first piston slidably disposed in said cylinder,
   a second piston slidably disposed in said cylinder, annular sealing means coacting with said second piston to provide an annular space surrounding a portion of said second piston and sealed from said drive rod, said drive rod extending through said first and second pistons.

* * * * *